(12) United States Patent
Dorulla et al.

(10) Patent No.: US 6,952,875 B2
(45) Date of Patent: Oct. 11, 2005

(54) CRUSH RING TO SEAL THE COUNTER PLATE ON HYDRODYNAMIC BEARING

(75) Inventors: Robin Francis Dorulla, Santa Cruz, CA (US); Mark Gregory Steele, Scotts Valley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/119,243

(22) Filed: Apr. 8, 2002

(65) Prior Publication Data

US 2003/0095728 A1 May 22, 2003

Related U.S. Application Data

(60) Provisional application No. 60/334,024, filed on Nov. 19, 2001.

(51) Int. Cl.[7] ............................. B21K 1/10; F16C 32/06
(52) U.S. Cl. ............................. 29/898.02; 29/898.041; 29/898.07; 29/898.09; 29/898.11; 384/124
(58) Field of Search ................. 29/898.02, 898.041, 29/989.07, 898.09, 898.11; 384/121, 124; 277/910, 950, 939, 931

(56) References Cited

U.S. PATENT DOCUMENTS

| | | | | |
|---|---|---|---|---|
| 4,372,565 A | * | 2/1983 | Lien | 277/614 |
| 4,828,403 A | * | 5/1989 | Schwartzman | 384/100 |
| 5,570,573 A | * | 11/1996 | Bonnelie | |
| 5,793,129 A | * | 8/1998 | Parsoneault et al. | |
| 5,938,343 A | * | 8/1999 | Grantz et al. | |
| 6,004,036 A | * | 12/1999 | Kloeppel et al. | |
| 6,502,990 B2 | * | 1/2003 | Narita | |

* cited by examiner

Primary Examiner—David P. Bryant
Assistant Examiner—Eric Compton
(74) Attorney, Agent, or Firm—Morrison & Foerster LLP

(57) ABSTRACT

A fluid dynamic bearing including a shaft rotating within a sleeve and a thrust plate or the like supported at an end of the shaft rotating in a recess defined with the sleeve. The thrust plate faces a counterplate supported from the sleeve over the recess, and the sleeve and shaft are supported for rotation by fluid in the gap or gaps between the shaft and sleeve, thrust plate and sleeve, and thrust plate and counterplate. To prevent fluid from leaking out of the fluid dynamic bearing into the surrounding atmosphere by seeping between the counterplate and sleeve face it rests on, a seal recess is defined in the sleeve, a crush ring seal is placed in the recess. The counterplate is then pressed into the recess, crushing the crush seal ring and blocking any passage of the fluid from the gap region surrounding the thrust plate through the gap between counterplate and sleeve.

The crush seal may preferably be either in an o form, a block form or an x form, and may be solid or hollow, preferably of a material which expands at approximately the same rate as the surrounding sleeve and counterplate. Preferred materials from which the crush seal may be selected include aluminum, brass, copper, and steel.

7 Claims, 3 Drawing Sheets

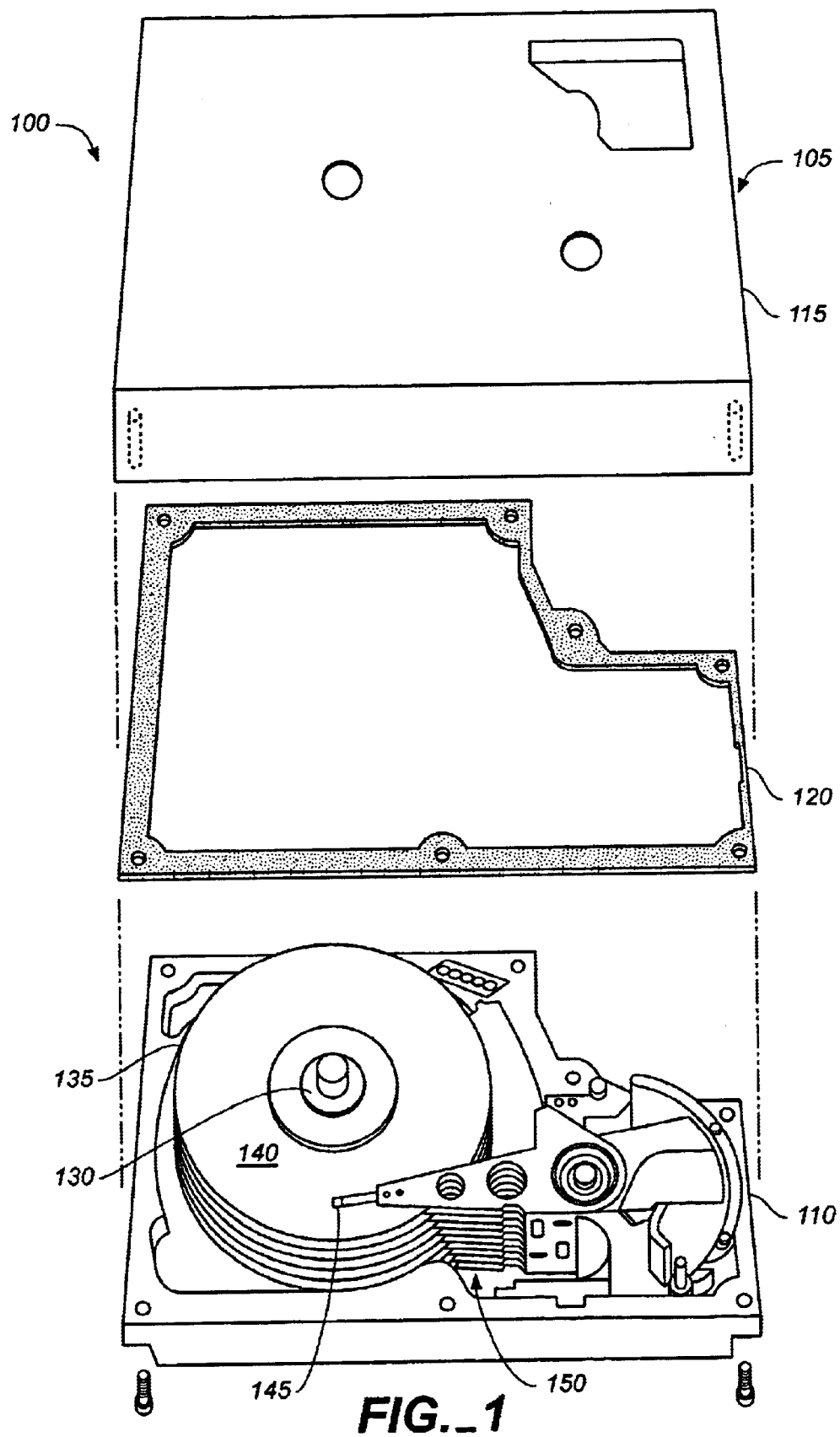
FIG._1

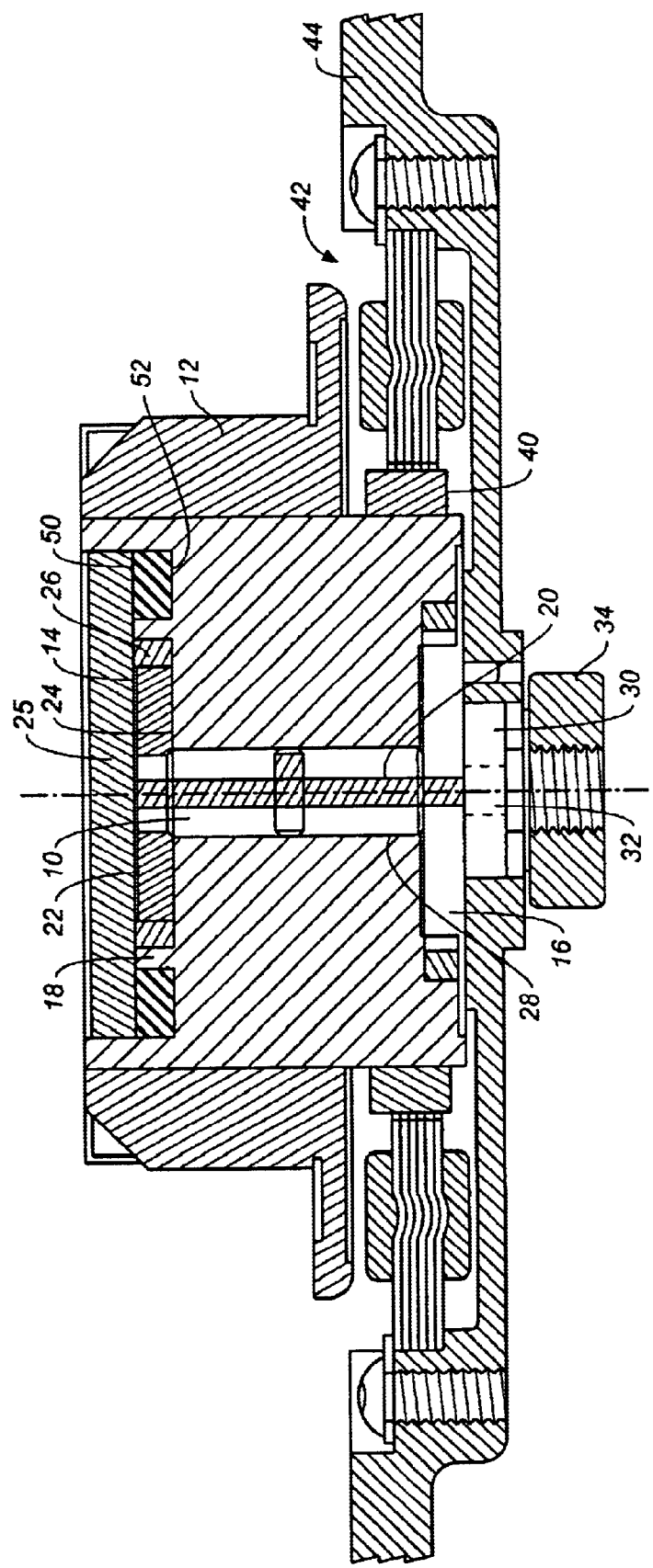
FIG._2

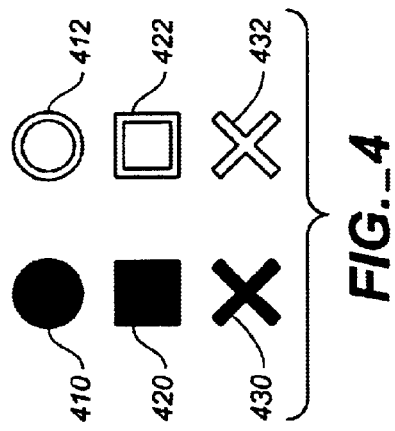
FIG._4
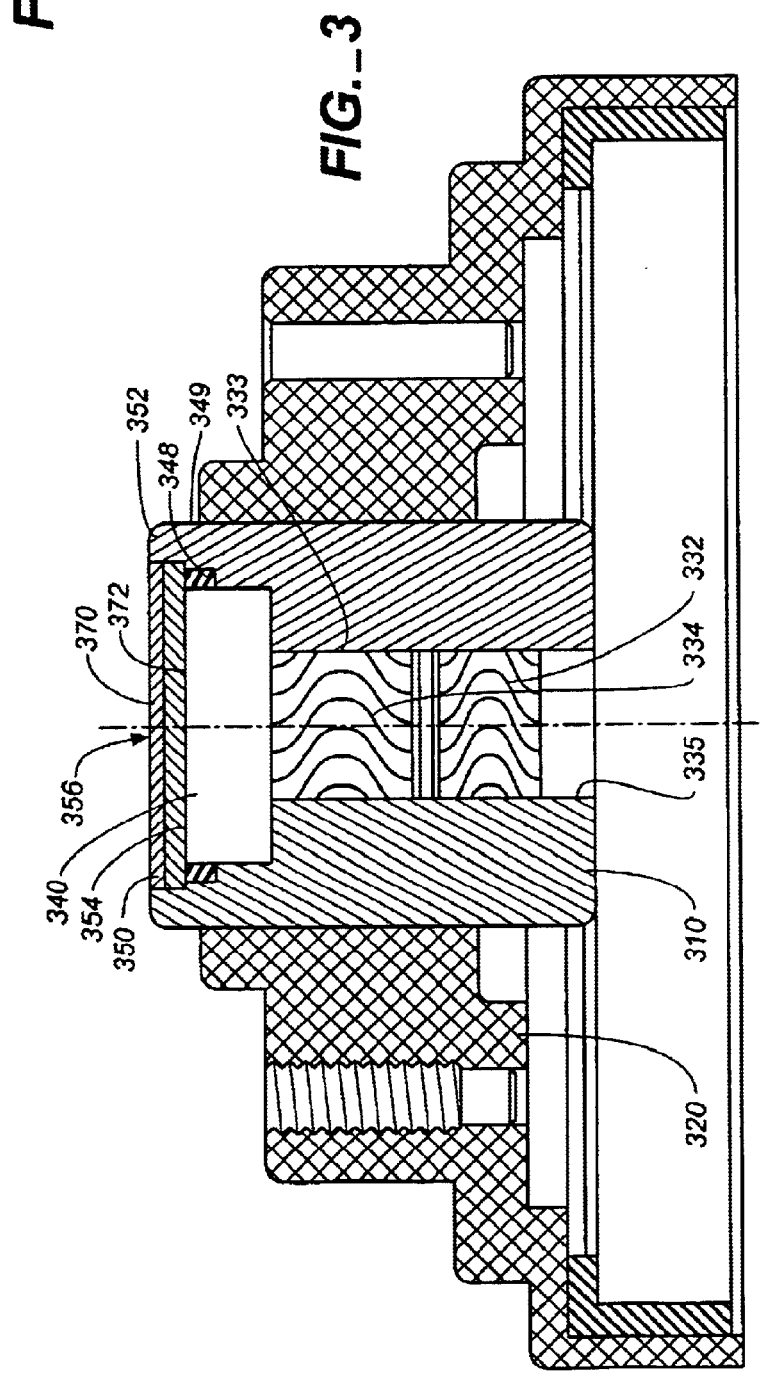
FIG._3

CRUSH RING TO SEAL THE COUNTER PLATE ON HYDRODYNAMIC BEARING

CROSS REFERENCE TO A RELATED APPLICATION

This invention is based on the provisional application No. 60/334,024, filed Nov. 19, 2001; the priority of this application is hereby claimed, and that provisional application is incorporated herein by reference.

FIELD OF THE INVENTION

The present invention relates to the field of fluid dynamic bearing assemblies, and more specifically to an improved apparatus for sealing the fluid bearing from the outside atmosphere.

BACKGROUND OF THE INVENTION

Disc drive memory systems have been used in computers for many years for storage of digital information. Information is recorded on concentric memory tracks of a magnetic disc medium, the actual information being stored in the form of magnetic transitions within the medium. The discs themselves are rotatably mounted on a spindle, the information being accessed by means of transducers located on a pivoting arm which moves radially over the surface of the disc. The read/write heads or transducers must be accurately aligned with the storage tracks on the disc to ensure proper reading and writing of information; thus the discs must be rotationally stable.

During operation, the discs are rotated at very high speeds within an enclosed housing by means of an electric motor which is generally located inside the hub or below the discs. One type of motor in common use is known as a spindle motor. Such motors typically have a spindle mounted by means of two ball bearing systems to a motor shaft disposed in the hub. One of the bearings is typically located near the top of the spindle, and the other near the bottom. These bearings allow for rotational movement between the shaft and hub, while maintaining accurate alignment of the spindle to the shaft. The bearings themselves are normally lubricated by grease or oil.

The conventional bearing system described above, however, is prone to several shortcomings. First is the problem of vibration generated by the balls rolling on the raceways. Ball bearings used in hard disc drive spindles run under conditions that generally result in physical contact between raceway and ball, in spite of the lubrication layer provided by the bearing oil or raceway and ball, in spite of the lubrication layer, in spite of the lubrication layer provided by bearing oil or grease. Hence, bearing balls running on the generally smooth but microscopically uneven and rough raceways transmit this surface structure as well as their imperfections in sphericity in the form of vibration to the rotating disc. This vibration results in misalignment between the data tracks and the read/write transducer, limiting the data track density and the overall performance of the disc drive system.

Another problem is related to the application of hard disc drives in portable computer equipment and resulting requirements in shock resistance. Shocks create relative acceleration between the discs and the drive casting which in turn show up as a force across the bearing system. Since the contact surfaces in ball bearings are very small, the resulting contact pressures may exceed the yield strength of the bearing material, and leave long term deformation and damage to the raceway and the balls of the ball bearing.

Moreover, mechanical bearings are not easily scaleable to smaller dimensions. This is a significant drawback since the tendency in the disc drive industry has been to continually shrink the physical dimensions of the disc drive unit.

As an alternative to conventional ball bearing spindle systems, hydrodynamic bearings are being adopted. In these types of systems, lubricating fluid—either gas or liquid—functions as the actual bearing surface between a stationary base or housing and the rotating spindle or rotating hub of the motor. For example, liquid lubricants comprising oil, more complex ferromagnetic fluids or even air have been utilized in hydrodynamic bearing systems. The reason for the popularity of the use of air is the importance of avoiding the outgassing of contaminants into the sealed area of the head/disc housing. However, air does not provide the lubricating qualities of oil. The relatively high viscosity of oil allows for larger bearing gaps and therefore greater tolerances to achieve similar dynamic performance.

An essential feature of such fluid dynamic bearings is to seal the bearing from the surrounding atmosphere, especially when the bearing or the motor in which the bearing is incorporated is to be used in a disc drive.

In the prior art, especially in designs incorporating a shaft and thrust plate, where the thrust plate faces a counterplate and defines a thrust bearing therewith, the counterplate rests within a recess in the sleeve. To prevent the fluid which is used to support the thrust plate and counterplate for relative rotation from seeping out of this region between the counterplate and sleeve, a recess has typically been defined in the sleeve, and an o-ring placed therein, sealing the gap between the stationary sleeve and the facing, stationary counterplate. However, with time the o-ring loses some of its elasticity, allowing fluid to potentially seep past.

Further, the elastic o-ring of the prior art tends to absorb oil over time, thereby reducing the amount of fluid in the fluid bearing. Such o-rings also tend to outgas, a very undesirable feature in a sealed atmosphere such as is typically found in a disc drive. A further effort has been made to seal the fluid dynamic bearing from the surrounding atmosphere by welding the outer edge of the counterplate to the surrounding sleeve. However, this approach can create stresses on the counterplate and requires expensive equipment. Therefore, an alternative, reliable, inexpensive and easy to assembly approach to sealing the hydrodynamic bearing from the surrounding disc drive atmosphere continues to be sought.

SUMMARY OF THE INVENTION

The present invention solves many of the above problems of the prior art.

The present invention provides a reliable apparatus and method for sealing a thrust plate style fluid dynamic bearing from the surrounding atmosphere.

These and other objectives and advantages are achieved in a design comprising a fluid dynamic bearing including a shaft rotating within a sleeve and a thrust plate or the like supported at an end of the shaft rotating in a recess defined with the sleeve. The thrust plate faces a counterplate supported from the sleeve over the recess, and the sleeve and shaft are supported for rotation by fluid in the gap or gaps between the shaft and sleeve, thrust plate and sleeve, and thrust plate and counterplate. To prevent fluid from leaking out of the fluid dynamic bearing into the surrounding atmosphere by seeping between the counterplate and sleeve face it rests on, a seal recess is defined in the sleeve, and a crush ring seal is placed in the recess. The counterplate is then pressed into the recess, crushing the crush seal ring and blocking any passage of the fluid from the gap region surrounding the thrust plate through the gap between counterplate and sleeve.

The crush seal may preferably be either in an o form, a block form or an x form, and may be solid or hollow. It preferably comprises a material which is crushable under sufficient pressure, and thermally expands at approximately the same rate as the surrounding sleeve and counterplate. It is also comprised of a material which puts little resilient force against the counterplate so that the counterplate stays firmly seated in the recess, and does not absorb oil. Preferred materials from which the crush seal may be selected include aluminum, brass, copper, and steel.

Other features and advantages of the invention will be apparent to a person of skill in this field who studies the description of the following preferred embodiment given with respect to the following drawings.

BRIEF DESCRIPTION OF THE DRAWINGS

FIG. 1 is an exploded perspective view of a disc drive in which a motor incorporating the present sealed design is useful;

FIG. 2 is a vertical section of a motor incorporating the prior art seal; and

FIG. 3 is a vertical section of a portion of a motor incorporating the present invention and FIG. 4 are cross-sectional views of various embodiments of the crushed seal used in the design of FIG. 3.

DETAILED DESCRIPTION OF A PREFERRED EMBODIMENT

The description to follow of a preferred embodiment or embodiments of the present invention teaches a highly efficient apparatus and method for sealing the counterplate without the need for welding in a hydrodynamic bearing motor. The technique is especially useful in thrust plate design hydrodynamic bearings incorporated in spindle motors for use in a disc drive, as the loss of fluid from the dynamic bearing or any outgassing from materials to use to seal the dynamic bearing is especially undesirable in such an environment. However, the present invention has many other uses that in motors for hard disc drives, and is not intended to be limited to uses in such environment. The invention has other uses, because the preservation of the fluid level in a fluid dynamic bearing is always a critical feature to provide long life for the fluid dynamic bearing. However, it is especially useful in hard disc drives because of the importance of not having any fluid leak out of the bearing or motor or expelled from the bearing over the entire life of the bearing, as contamination of the atmosphere within the hard disc drive by droplets are outgassing is especially undesirable.

The basic principles of the invention will be explained with respect to a hydrodynamic bearing used in a spindle motor such as is used in the disc drive shown in the exploded view of FIG. 1, the spindle motor itself being shown in the vertical sectional view of FIG. 2. FIG. 1 shows a disc drive 100 including a base 110, a cover 115, and a sealing ring 120 which may be used to seal the two together to provide a sealed environment for the disc drive.

A spindle motor generally indicated at 130 and to be described in detail below includes a hub which supports one or more discs 140 for rotation at constant speed. Each of these discs has one or both surfaces comprising a plurality of tracks on which data is stored. An actuator generally indicated at 150 supports a plurality of actuator arms, each having a transducer at an end thereof which is associated with the disc storage surface. As the disc rotates, the transducer flies on a thin cushion of air over the surface of the disc and reads and writes data to and from tracks on the disc. It is essential to the long lived operation of the motor which must rotate at high speed and at constant speed for hours at a time and maintain that on a daily basis for years at a time that the fluid be maintained in the gaps which define the hydrodynamic bearings and which in turn support the hub, and the discs it carries for rotation. Thus it is essential that some apparatus and method be adopted for sealing the fluid dynamic bearing from the outside atmosphere. This prevents contamination of that atmosphere and loss of the fluid which is so essential to the long life of the hydrodynamic bearings.

Considering the spindle motor with a fluid dynamic bearing shown in FIG. 2, the figure shows a shaft 10 supported from the base 44 by a shoulder 16. The shaft is shown mounted into an extension of the base 34 by a threaded extension 32 to hold it stable. The shaft includes, on a distal end from the base, a thrust plate 14. This thrust plate 14 has thrust bearings 22 and 24 on either axial surface thereof, defined by grooves on either the surface of the thrust plate or the facing surface of the sleeve 18 or counterplate 25. Fluid in the gap between these thrust plate surfaces supports the thrust plate for rotation. The fluid is also found in the gap 26 facing the radial end of the thrust plate 14. Further, a journal bearing is found along the surface, defined between the outer surface of the shaft 10 and the inner surface of the sleeve 18. In this particular embodiment, fluid is also maintained in a reservoir channel 20 in the center of the shaft 10, although this feature is of no particular structural significance to this invention. The fact is that fluid must be maintained over the surface of the journal bearing defined by gap 28 and the thrust bearing defined by gaps 22 and 24. In the embodiment of the prior art shown herein, a rubber o-ring 50 is located in a recess 52 of the sleeve 18 inboard of the hub 12 which supports the discs for rotation. It was believed that this o-ring would be satisfactory to prevent loss of the fluid needed for the fluid bearing. However, the elastic nature of the rubber ring places a force against the counterplate which may tend to displace it; such a marginal displacement, even if extremely small, can result in further leakage between the counterplate and sleeve. Further, the o-ring of this type tends to absorb oil over time, which reduces the amount of fluid available for the fluid dynamic bearing. Further, the o-ring 50 may outgas over time, which is an undesirable characteristic of the material and is counter to the maintenance of a sealed environment in which to operate the disc drive system.

Therefore, the approach of FIG. 3 is believed to represent an improvement over the prior art. According to this design, a sleeve 310 is provided supporting a hub 320. The groove patterns 332, 334 which define the journal bearing 333 are shown defined on the inner surface of the sleeve bore 335 which surrounds the shaft (not shown); however, these patterns as it is well known in this field could be just as well defined on the outer surface of the shaft.

The recess 340 is shown defined in the sleeve 310 for receiving the thrust plate (not shown) which is supported on the end of the shaft. To prevent any loss of the fluid which supports both the journal bearing 330 and the thrust bearings which are defined in the recess 340, the present invention has been defined. Pursuant to this invention, a recess 350 is defined in the shoulder 352 of the sleeve radially spaced from the recess 340 and on the axially facing surface 354 of the shoulder 352 where the counterplate 356 rests after the motor and/or bearing is assembled. One of a plurality of possible crush rings 370 re placed in the recess 350 prior to insertion of the counterplate 356. The crush ring 370 itself will be described below with respect to FIG. 4. The crush ring 370 is characterized by among other things, that it will remain compliant for a long period of time, and preferably expands at the same rate as the si eve 320 and counterplate 356 against which it presses. It also is preferably is s I cted of a material that does not absorb oil, and exerts little elastic force against th counterplate 356. The counterplate will continue to rest securely in its recess. Examples of appropriate materials would be aluminum, brass, copper or steel.

In assembling the seal plate and motor, after the thrust plate (see FIG. 2) has been put in place, the counterplate 356 can be pressed or inserted into its recess 346. First however, the crush ring 370 in preferably one of the designs shown in FIG. 4, is placed in its recess 350 so that it is crushed to fill the recess and any space between the surface of the sleeve 354 and the facing surface 372 of the counterplate 356. To be sure that the counterplate is held in place in its recess 350, preferably an adhesive is used on either the vertical wall 348 or the horizontal section 349 of recess wall radially outboard of the recess in which the crush ring seal is placed.

Referring next to FIG. 4, this figure illustrates a plurality of various crush seals of differing cross-section. As shown, the seal may adopt an O-ring configuration which is either solid 410 or hollow 412. Alternatively, a block ring configuration may be used which is either solid 420 or hollow 422. Yet another alternative would be an x-ring configuration which is substantially solid 430 or hollow 432. By solid it meant that it appears substantially solid. Obviously, it would be sufficiently porous or of a density that lends itself to crushing under appropriate pressure.

Other features and advantages of the invention would be apparent to a person of skill in the art who studies this disclosure. Therefore, the scope of the invention is to be limited only by the following claims.

What is claimed is:

1. A method of assembling a fluid dynamic bearing comprising a shaft and a thrust plate on an end thereof; a sleeve defining a bore surrounding the shaft, a gap between the shaft and the sleeve having fluid therein to support the shaft and the sleeve for relative rotation, the sleeve further defining a first recess at an end of the shaft bore, and a second recess axially adjacent the first recess, the sleeve further comprising a third recess radially adjacent the first recess for the thrust plate, the method comprising inserting the shaft and thrust plate into the bore and first recess of the sleeve, inserting a crush ring into the third recess, and then inserting a counterplate into the third recess, crushing the crush ring between the counterplate and the sleeve, thereby plastically deforming the crush ring, to permanently close and prevent loss of fluid from a gap between the counterplate and the sleeve.

2. A method is claimed in claim 1 wherein the crush ring has a cross-section which is solid and is selected from a group comprising an o-ring, a block ring, or an x-ring, and is of a porosity, density or cross section to be crushed uner pressure from the counterplate into the third recess under pressure.

3. A method as claimed in claim 1 herein the crush ring is hollow and is selected from group comprising a o-ring, a block ring, and an x-ring, and is of a porosity, density or cross section to be crushed uner pressure from the counterpart into the third recess under pressure.

4. A method as claimed in claim 1 wherein material of the crush ring is selected from the group comprising aluminum, brass, copper or steel.

5. A method as claimed in claim 1 wherein the crush ring comprises a material which expands at substantially the same rate as the sleeve in which the second recess is defined and the counterplate.

6. A method as claimed in claim 1 wherein the counterplate is press fit in the second recess defined in the sleeve.

7. A method as claimed in claim 1 further comprising disposing adhesive between the radially outer surface of the counterplate end the inner wall of the third recess in the sleeve.

* * * * *